US011840792B2

(12) United States Patent
Rhyu et al.

(10) Patent No.: US 11,840,792 B2
(45) Date of Patent: Dec. 12, 2023

(54) SUSPENSION ARRAY AND CLOTHES TREATING APPARATUS INCLUDING THE SAME

(71) Applicant: LG Electronics Inc., Seoul (KR)

(72) Inventors: Doyoung Rhyu, Seoul (KR); Bosun Chung, Seoul (KR); Jong Min Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 432 days.

(21) Appl. No.: 16/983,126

(22) Filed: Aug. 3, 2020

(65) Prior Publication Data
US 2021/0062389 A1 Mar. 4, 2021

(30) Foreign Application Priority Data

Sep. 4, 2019 (KR) .................. 10-2019-0109707

(51) Int. Cl.
*F16F 9/32* (2006.01)
*F16F 13/00* (2006.01)
(Continued)

(52) U.S. Cl.
CPC ............ *D06F 37/24* (2013.01); *F16F 9/3278* (2013.01); *F16F 13/007* (2013.01);
(Continued)

(58) Field of Classification Search
CPC ...... D06F 37/24; D06F 37/268; F16F 9/3278; F16F 13/007; F16F 2238/02; F16F 2238/04; F16F 7/08; F16F 1/12; F16F 2238/026
See application file for complete search history.

(56) References Cited

U.S. PATENT DOCUMENTS

2016/0024705 A1* 1/2016 Hernden ................. D06F 37/20
 267/140.13
2017/0268148 A1* 9/2017 Davis .................... D06F 37/268

FOREIGN PATENT DOCUMENTS

CN 101392446 3/2009
CN 102971457 3/2013
(Continued)

OTHER PUBLICATIONS

Office Action in Chinese Appln. No. 202010795492.3, dated Jul. 15, 2022, 13 pages (with English translation).
(Continued)

*Primary Examiner* — Benjamin L Osterhout
(74) *Attorney, Agent, or Firm* — Fish & Richardson P.C.

(57) ABSTRACT

A suspension array includes a support rod, an elastic member wound around the support rod, a housing supported by the elastic member and including a compartment surrounding the support rod, the support rod being coupled to the housing while penetrating the housing in the longitudinal direction, a friction member installed inside the housing to cause friction with the support rod when the friction member in the compartment is displaced, and a cap penetrated in the longitudinal direction by the support rod and coupled with the housing to cover the compartment, wherein the support rod penetrates the cap along the longitudinal direction and wherein the housing includes one or more first holes configured to discharge, to the outside, condensate generated in an inner space defined by the coupling between the cap and the housing.

20 Claims, 9 Drawing Sheets

(51) Int. Cl.
*D06F 37/24* (2006.01)
*F16F 1/12* (2006.01)
*D06F 37/26* (2006.01)
*F16F 7/08* (2006.01)

(52) U.S. Cl.
CPC .............. *D06F 37/268* (2013.01); *F16F 1/12* (2013.01); *F16F 7/08* (2013.01); *F16F 2238/026* (2013.01); *F16F 2238/04* (2013.01)

(56) References Cited

FOREIGN PATENT DOCUMENTS

| | | |
|---|---|---|
| CN | 202937719 | 5/2013 |
| CN | 105316897 | 2/2016 |
| CN | 105316898 | 2/2016 |
| CN | 105316898 A | 2/2016 |
| CN | 106812844 | 6/2017 |
| JP | H067583 | 1/1994 |
| JP | H0663284 | 3/1994 |
| KR | 10-1054425 | 8/2011 |
| KR | 20060007465 A | 8/2011 |
| KR | 10-1754683 | 7/2017 |
| WO | WO2015125075 A1 | 8/2015 |

OTHER PUBLICATIONS

Office Action in Chinese Appln. No. 202010795492.3, dated Mar. 3, 2023, 19 pages (with English translation).

* cited by examiner

SUSPENSION ARRAY AND CLOTHES TREATING APPARATUS INCLUDING THE SAME

CROSS-REFERENCE TO RELATED APPLICATION

This present application claims benefit of priority to Korean Patent Application No. 10-2019-0109707, entitled "SUSPENSION ARRAY AND CLOTHES TREATING APPARATUS INCLUDING THE SAME," filed on Sep. 4, 2019, in the Korean Intellectual Property Office, the entire disclosure of which is incorporated herein by reference.

BACKGROUND

1. Technical Field

The present disclosure relates to a suspension array and a clothes treating apparatus including the same, and more particularly, to a suspension array having improved performance in damping vibrations due to the movement of the washing tub as well as supporting the load of the washing tub, and a clothes treating apparatus including the same.

2. Description of Related Art

In general, clothes require several forms of care, such as washing, drying, storage, and ironing. To this end, clothes treating apparatuses, capable of washing, drying, storing, and ironing, respectively, are being implemented. In addition, clothes treating apparatuses incorporating functions such as washing and drying, storage and ironing, and the like are also being implemented.

In particular, a washing machine, which is an apparatus configured to treat clothes for washing, includes a casing forming the exterior of the washing machine, an outer tub hanging inside the casing, and an inner tub rotatably provided inside the outer tub. In addition, the washing machine further includes a suspension configured to damp vibration of the outer tub due to the rotation of the inner tub and/or a pulsator.

Typically, the suspension has a structure that damps vibrations of the outer tub by using elastic/restoring force of a spring, viscous force of a fluid, and the like. However, when the suspension is designed to be optimized for a transient vibration state having a large amplitude, the vibration damping effect of the suspension decreases in a steady vibration state having a relatively small amplitude, and vice versa.

Therefore, there is a need to devise a method to effectively damp vibration in both steady and transient vibration states.

In particular, in order for the suspension to perform its original function smoothly, appropriate treatment for condensate and frictional heat that may occur in a vibration damping process is required. This is because the performance of the suspension may be deteriorated by the condensate and the frictional heat.

In relation to the above-described clothes treating apparatuses, Korean Patent Registration No. 10-1754683 (hereinafter referred to as "related art 1"), entitled "WASHING MACHINE", discloses a washing machine.

Specifically, related art 1 discloses a support rod, an elastic member, a housing body configured to be moved along the support rod and elastically supported by the elastic member, an outer tub support configured to support the outer tub in a state seated on the housing body, a friction unit configured to exert a friction force on the support rod and displaceable with respect to the housing body, and the like.

The washing machine of related art 1 relates to a configuration that improves the vibration damping performance of the suspension by a friction unit, and describes a suspension structure configured for easy replenishment of lubricant. However, related art 1 does not disclose a configuration capable of treating the condensate and the frictional heat generated in the vibration damping process.

Further, Korean Patent Registration No. 10-1054425 (hereinafter referred to as "related art 2"), entitled "LEG APPARATUS OF DRUM-TYPE WASHER", discloses a leg apparatus of a washing machine.

Specifically, related art 2 discloses a configuration in which springs, disposed at the upper and lower portions of a holder, reduce vibration when the vibration occurs in the base fan during operation of the washing machine, a configuration to reduce vibration of the base fan using air pressure inside the casing in which an air hole is formed, and the like.

Related art 2 discloses a washing machine including a configuration in which air flows through air holes formed in a portion of the suspension. However, the air holes in related art 2 are only a configuration for utilizing air pressure to reduce vibration, and are not related to a configuration capable of treating the condensate and the frictional heat generated in the vibration damping process.

As described above, the suspensions in related arts 1 and 2 are faced with various shortcomings in properly treating the condensate and the friction heat that may be generated in the vibration damping process.

RELATED ART DOCUMENTS

Related Art 1: Korean Patent Registration No. 10-1754683 (registered on Jun. 30, 2017)

Related Art 2: Korean Patent Registration No. 10-1054425 (registered on Jul. 29, 2011)

SUMMARY

The present disclosure is directed to addressing the above-described shortcomings associated with a suspension array and a clothes treating apparatus including the same.

The present disclosure is further directed to preventing deterioration of the performance of the suspension array by properly discharging, to the outside, internal condensate that may be generated in the vibration damping process by the suspension array.

The present disclosure is still further directed to designing the shape of the suspension array so that the discharge of the internal condensate may be facilitated while maintaining a predetermined structural rigidity for implementing the vibration damping function.

The present disclosure is still further directed to preventing deterioration of the performance of the suspension array by properly discharging, to the outside, internal frictional heat that may be generated in the vibration damping process by the suspension array.

Aspects of the present disclosure are not limited to the above-mentioned aspects, and other technical aspects not mentioned above will be clearly understood by those skilled in the art from the following description.

A suspension array and a clothes treating apparatus including the same according to an aspect of the present disclosure are configured such that condensate generated in the vibration damping process is discharged to the outside.

Specifically, the condensate generated in an inner space, defined by the coupling between a housing and the cap, is discharged to the outside through one or more first holes formed in the housing.

In a suspension array and a clothes treating apparatus including the same according to an aspect of the present disclosure, the one or more first holes may be formed along the circumference of the housing on a faying surface of the housing coupled to the cap.

In addition, in a suspension array and a clothes treating apparatus including the same according to an aspect of the present disclosure, the shape of the housing is designed to maintain structural rigidity without disturbing the formation of the one or more first holes. Specifically, a plurality of ribs are configured to protrude radially around a compartment of the housing, and the one or more first holes are formed between the ribs.

In addition, a suspension array and a clothes treating apparatus including the same according to an aspect of the present disclosure are configured such that frictional heat generated in the vibration damping process is discharged to the outside. Specifically, one or more second holes formed in a cap are configured to communicate with the one or more first holes, so that air in the inner space, defined by the coupling between the housing and the cap, is ventilated to the outside.

In addition, in a suspension array and a clothes treating apparatus including the same according to an aspect of the present disclosure, the one or more second holes may be formed along the circumference of the cap on the side surface of the cap.

In addition, in a suspension array and a clothes treating apparatus including the same according to an aspect of the present disclosure, the one or more second holes may be formed to be inclined downward from the inside of the cap to the outside.

In addition, in a suspension array and a clothes treating apparatus including the same according to an aspect of the present disclosure, the one or more first holes may be formed in a plurality of rows along the circumference of the housing.

In addition, in a suspension array and a clothes treating apparatus including the same according to an aspect of the present disclosure, the one or more first holes the one or more second holes may be formed symmetrically around the support rod, and the one or more second holes may be formed symmetrically around the support rod.

In addition, in a suspension array and a clothes treating apparatus including the same according to an aspect of the present disclosure, the one or more second holes may be formed with a diameter of a size that allows passage of gas-phase particles but not liquid-phase particles.

In addition, in a suspension array and a clothes treating apparatus including the same according to an aspect of the present disclosure, the one or more first holes may be formed with a diameter of a size that allows passage of liquid-phase particles.

Aspects which can be achieved by the present disclosure are not limited what has been disclosed hereinabove and other aspects can be clearly understood from the following description by those skilled in the art to which the present disclosure pertains.

The effects of the suspension array and the clothing processing apparatus including the same according to the present disclosure are as follows.

According to at least one embodiment of the present disclosure, since the condensate generated in the inner space, defined by the coupling between the housing and the cap, is discharged to the outside through the one or more first holes formed in the housing, it is possible to prevent the performance of the suspension array from deteriorating even when the internal condensate is generated in the vibration damping process.

In addition, according to at least one embodiment of the present disclosure, since the one or more first holes are formed along the circumference of the housing on a faying surface of the housing coupled to the cap, it is possible to discharge, to the outside, the internal condensate generated in the vibration damping process without the internal condensate contacting the friction member.

In addition, according to at least one embodiment of the present disclosure, since a plurality of ribs are configured to protrude radially around the compartment of the housing and the one or more first holes are formed between the ribs, it is possible to easily form the one or more first holes on the circumference of the housing and to properly maintain the structural rigidity of the housing.

In addition, according to at least one embodiment of the present disclosure, since the one or more second holes are configured to communicate with the one or more first holes so that the air in the inner space, defined by the coupling between the housing and the cap, is ventilated to the outside, it is possible to prevent the performance of the suspension array from deteriorating even when frictional heat is generated in the vibration damping process.

In addition, according to at least one embodiment of the present disclosure, since the one or more second holes are formed along the circumference of the cap on the side surface of the cap, relatively more second holes may be formed, and thus the air in the inner space may be smoothly ventilated to the outside.

In addition, according to at least one embodiment of the present disclosure, since the one or more second holes are formed to be inclined downward from the inside of the cap to the outside, it is possible to minimize the inflow of water from outside the cap through the one or more second holes.

In addition, according to at least one embodiment of the present disclosure, since the one or more first holes are formed in a plurality of rows along the circumference of the housing, it is possible to smoothly discharge the condensate even when the condensate is generated at various points.

In addition, according to at least one embodiment of the present disclosure, since the one or more first holes are formed symmetrically around the support rod and the one or more second holes are formed symmetrically around the support rod, it is possible to uniformly discharge frictional heat without concentration of heat in a specific portion.

In addition, according to at least one embodiment of the present disclosure, since the one or more second holes are formed with a diameter of a size that allows passage of gas-phase particles but not liquid-phase particles, it is possible to prevent external water from entering through the one or more second holes even while air ventilation to the outside through the one or more second holes are smoothly performed.

In addition, according to at least one embodiment of the present disclosure, since the one or more first holes are formed with a diameter of a size that allows passage of liquid-phase particles, it is possible to smoothly discharge the condensate through the one or more first holes together with air ventilation to the outside through the one or more first holes.

Further scope of applicability of the present disclosure will be apparent from the above detailed description. It should be understood, however, that specific examples, such as the detailed description and the preferred embodiments of the present disclosure, are given by way of illustration only, since various changes and modifications within the spirit and scope of the present disclosure will become apparent to those skilled in the art.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

Wherever possible, the same reference numbers will be used throughout the drawings to refer to the same or like parts. In the following description, known functions or structures, which may confuse the substance of the present disclosure, are not explained.

Hereinafter, embodiments of the present disclosure will be described in detail with reference to the accompanying drawings.

Figure 1:
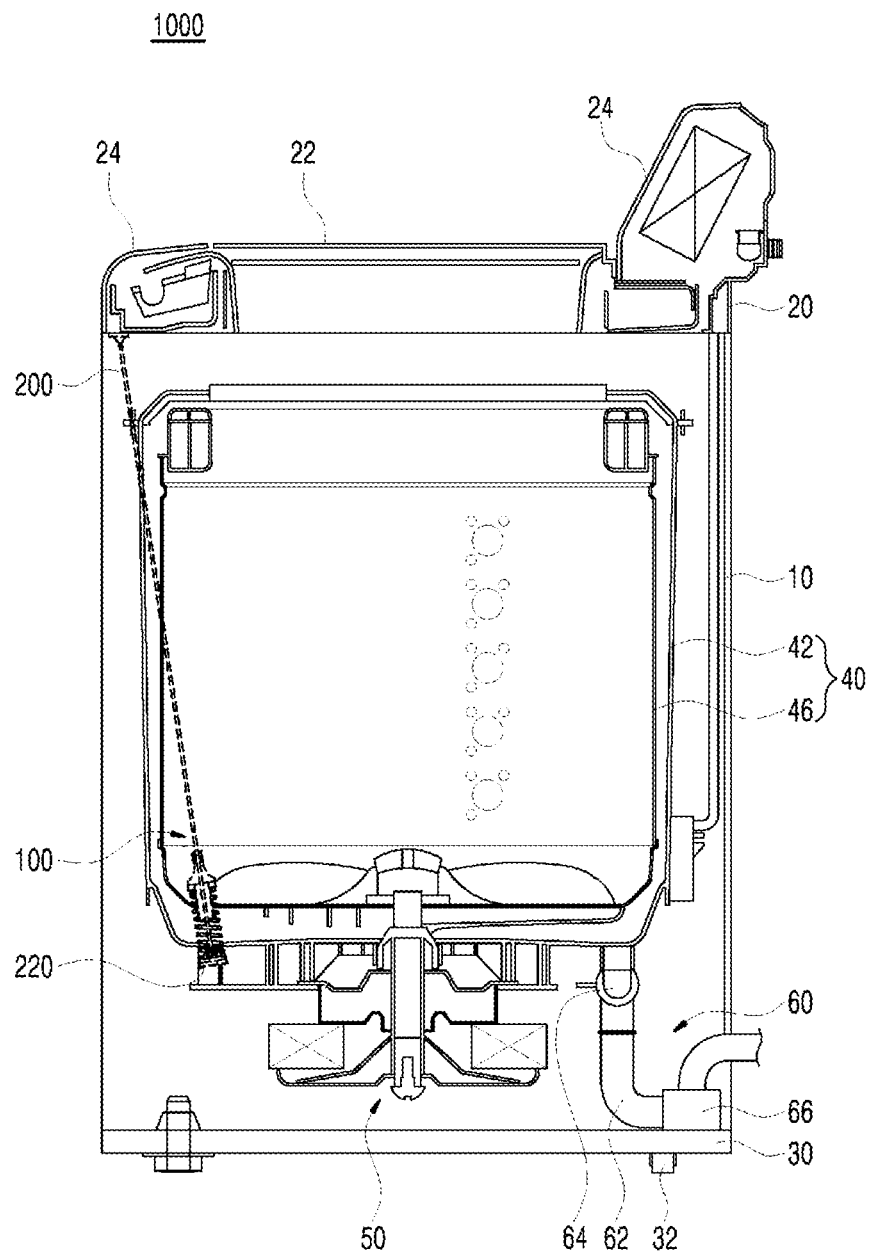
FIG. 1 is a cross-sectional view schematically showing a clothes treating apparatus according to one embodiment of the present disclosure.
Figure 2:
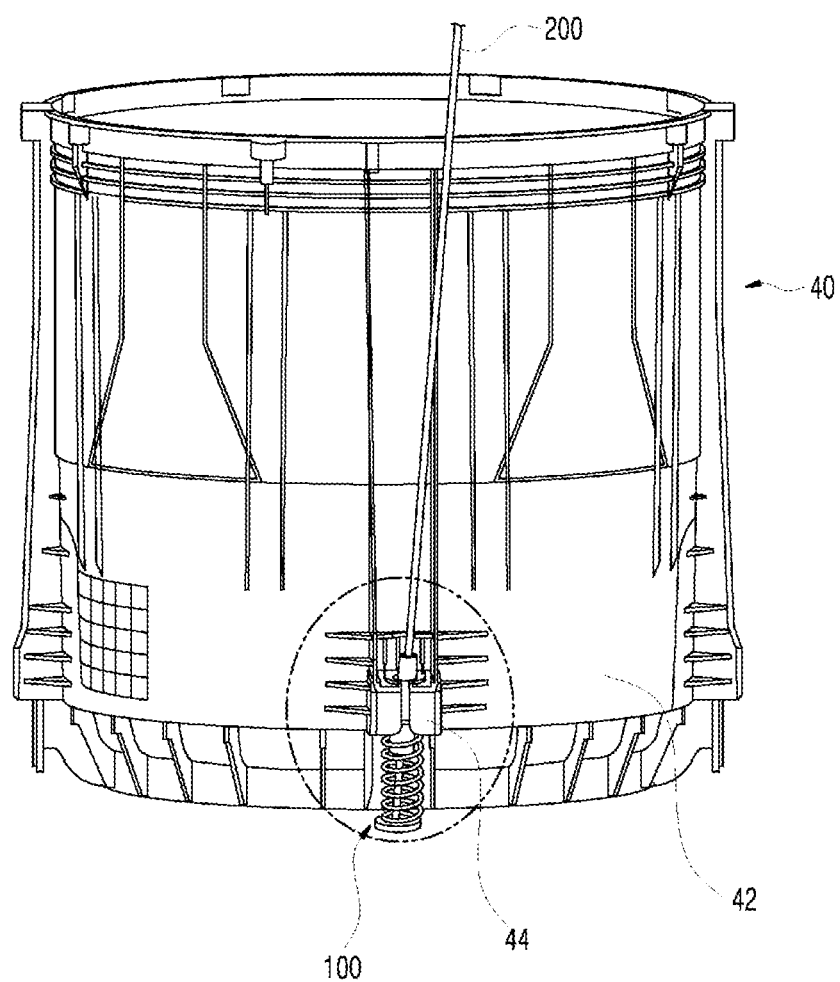
FIG. 2 is a perspective view showing a state in which a suspension array is mounted on a washing tub of FIG. 1.
Figure 3:
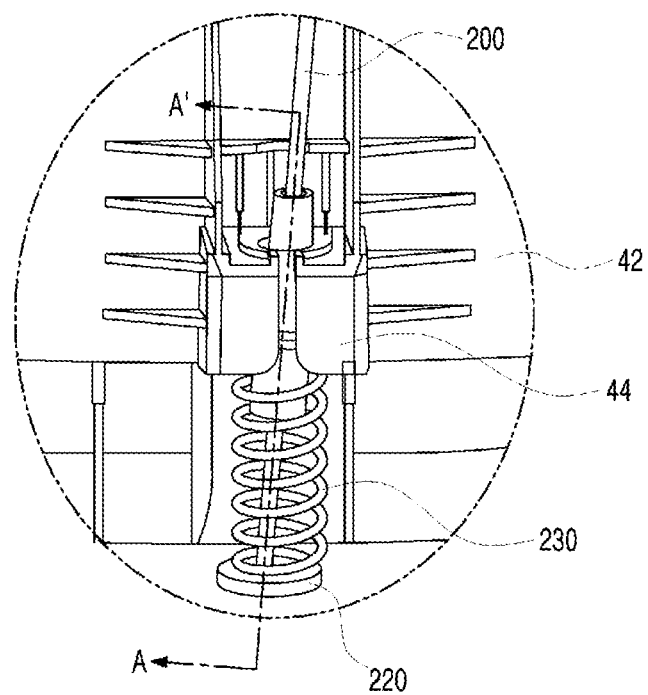
FIG. 3 is an enlarged view of a portion of the suspension array of FIG. 2.

FIG. 1 is a cross-sectional view schematically showing a clothes treating apparatus according to one embodiment of the present disclosure. FIG. 2 is a perspective view showing a state in which the suspension array is mounted on a washing tub of FIG. 1. FIG. 3 is an enlarged view of a portion of a suspension array of FIG. 2.

As shown in FIGS. 1 to 3, a clothes treating apparatus 1000 according to one embodiment of the present disclosure includes: a main body 10 forming the exterior of the clothes treating apparatus 1000 and having a receiving space therein; operation keys configured to receive various control commands from a user; a control panel 24 configured to provide a user interface and having a display or the like that displays information about the operating state of the clothes treating apparatus 1000; a door 22 pivotably provided in the main body 10 to open and close a laundry load hole through which laundry is loaded or removed.

An outer tub 42 containing washing water is suspended inside the main body 10 by a support rod 200. In the outer tub 42, an inner tub 46 configured to receive laundry is rotatably provided. A pulsator is rotatably provided on the bottom of the inner tub 46. A plurality of holes through which the washing water passes are formed in the inner tub 46.

A washing tub 40 consists of the outer tub 42 and the inner tub 46. The washing tub 40 is installed in the receiving space of the main body 10 by being coupled to the main body 10 by at least one suspension array 100.

The main body 10 may include: a cabinet of which an upper side is opened; and a top cover 20 provided on the upper side of the cabinet and having a laundry load hole, formed in a substantially central portion thereof, through which laundry is loaded or removed. A base 30 formed on the lower portion of the main body 10 is coupled to legs 32, whereby the main body 10 may be supported against the ground.

The support rod 200 extends in the longitudinal direction. One end of the support rod 200 is connected to the main body 10, and the other end of the support rod 200 is connected to the outer tub 42 by the suspension array 100. The one end of the support rod 200 may be connected to any one of the cabinet or the top cover 20. The cabinet or the top cover 20 may include a connection means to which the support rod 200 is pivotably connected.

The support rod 200 may include a support member 220 provided at the other end of the support rod 200. The support member 220 is a member that supports an elastic member 230 wound around the support rod 200 to prevent the elastic member 230 from deviating from the support rod 200. The diameter of the support surface of the support member 220 is preferably larger than the outer diameter of the elastic member 230 so that the elastic member 230 does not deviate from the support rod 200.

Rotation of the elastic member 230 around the support rod 200 may be restricted by the support member 220. In this case, the support member 220 may include a catching portion coupled with the lower end of the elastic member 230 or a raised portion limiting rotation of the lower end of the elastic member 230.

A water supply hose is connected to an external water source such as a faucet to supply water into the outer tub 42 and/or the inner tub 46. A water inlet valve controls the water supply. A driving unit 50 drives the inner tub 46 and/or a pulsator. A drain unit 60 may include a drain hose 62, a drain valve 64, and a drain pump 66. The drain hose 62 drains the washing water in the outer tub 42. The drain valve 64 controls drainage through the drain hose 62. The drain pump 66 pumps the washing water through the drain hose 62 to the outside of the washing machine.

The suspension array 100 damps the vibration of the outer tub 42 due to rotation of the inner tub 46 or the pulsator. The suspension array 100 is detachably coupled with the lower portion of the outer tub 42, thereby facilitating installation and removal of the suspension array 100.

For example, FIG. 3 shows a holder 44 protruding from the outer circumferential surface of the lower portion of the outer tub 42 so as to install the suspension array 100. A slit is formed on the side of the holder 44, which extends in the vertical direction and is opened in the lateral direction.

The combination of the suspension array 100 and the outer tub 42 is achieved by inserting the support rod 200 equipped with the configuration of the suspension array 100 into the holder 44 through the side opening of the slit, and by the holder 44 being seated on a cap 310 to be described below.

Since the load of the outer tub 42 is always applied to the cap 310, the outer tub 42 and the cap 310 are integrally moved without being separated. Meanwhile, separation of the suspension array 100 for maintenance may be achieved by pulling the suspension array 100 slightly downward and then pulling out the support rod 200 through the side opening of the slit.

Figure 4:
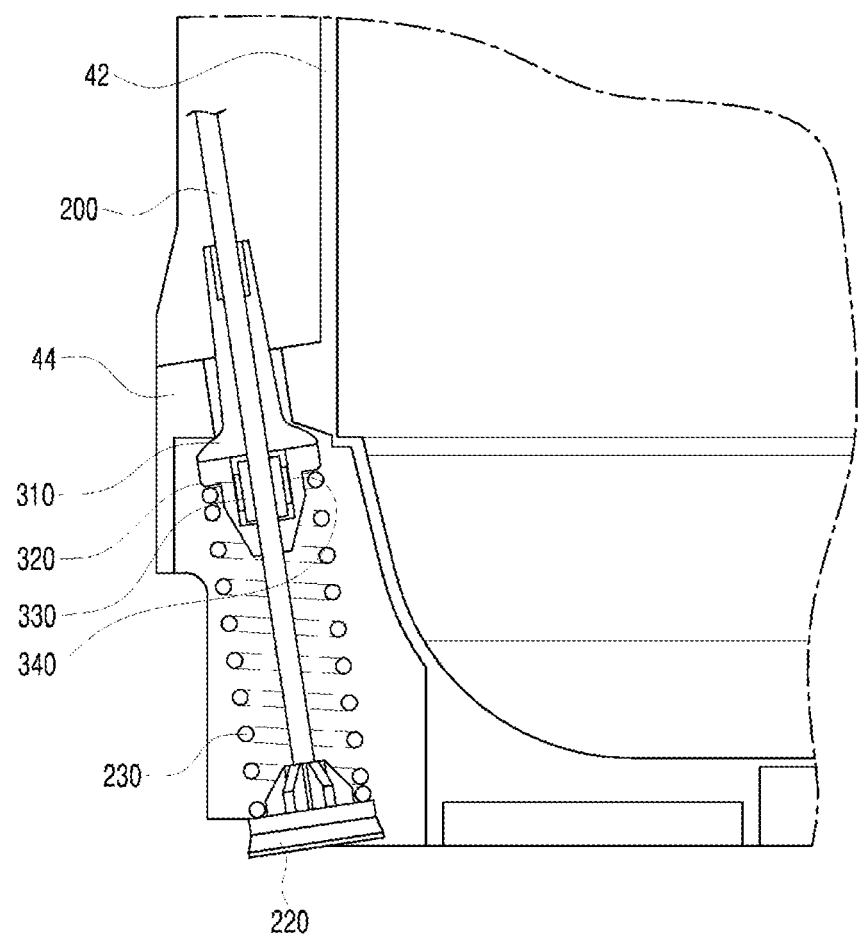
FIG. 4 is a cross-sectional view taken along line A-A' in FIG. 3.
Figure 5:
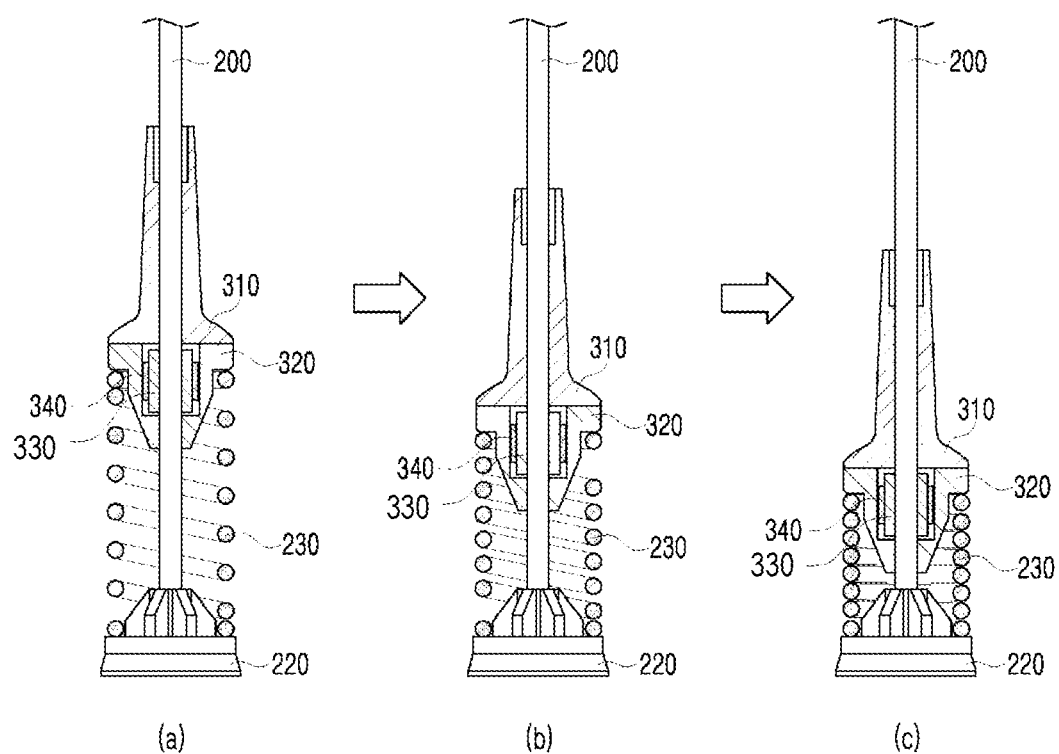
FIG. 5 is a view showing a state in which the suspension array is operated in the clothes treating apparatus according to one embodiment of the present disclosure.

FIG. 4 is a cross-sectional view taken along line A-A' in FIG. 3. FIG. 5 is a view showing a state in which a suspension array is operated in the clothes treating apparatus 1000 according to one embodiment of the present disclosure.

As shown in FIGS. 4 and 5, the suspension array 100 in the clothes treating apparatus 1000 according to one embodiment of the present disclosure includes the support rod 200, the elastic member 230, a housing 320, a friction member 330, and the cap 310.

Specifically, the support rod 200 is a rod-shaped member formed so as to extend along the longitudinal direction, and the elastic member 230 is wound around the support rod 200. Accordingly, the elastic member 230 may be supported by the support member 220 of the support rod 200.

The housing 320 is penetrated in the longitudinal direction by the support rod 200 and supported by the elastic member 230. The housing 320 includes a compartment 324 surrounding the support rod 200. Accordingly, the housing 320 is movable along the support rod 200, and is elastically supported by the elastic member 230. That is, the lower end of the elastic member 230 is supported by the support member 220, and the upper end of the elastic member 230 supports the housing 320.

The compartment 324 is an empty space surrounding the support rod 200 and receiving the friction member 330 to be described below. The friction member 330 received in the compartment 324 may be displaced in a vibration damping process. The housing 320 may be formed with an opening at the upper side thereof so that the friction member 330 may be inserted.

The friction member 330 is a component installed inside the housing 320 to cause friction with the support rod 200 when the friction member 330 in the compartment 324 is displaced. That is, the friction member 330 is movable along the support rod 200, and exerts the friction force (especially, kinetic friction force during the vibration of the outer tub 42) on the support rod 200.

The friction member 330 may be made of a porous fiber material such as felt or an elastic material such as rubber. The fixing guide 340 may prevent the friction member 330 from being separated from the support rod 200.

Due to the friction between the friction member 330 and the support rod 200, vibration energy is dissipated when vibration occurs during operation of the clothes treating apparatus 1000. That is, when the vibration occurs, the friction member 330 exerts a kinetic friction force on the support rod 200 to dissipate the vibration energy.

Referring to FIG. 5, when the vibration occurs, the housing 320 supported on the elastic member 230 may move up and down along the support rod 200. In this case, the friction member 330 accommodated in the compartment 324 of the housing 320 may also be moved up and down along the support rod 200. When the friction member 330 moves, the friction member 330 exerts the kinetic friction force on the support rod 200.

Accordingly, the elastic member 230 and the friction member 330 together may complementarily damp vibrations generated in the clothes treating apparatus 1000.

The cap 310 is penetrated in the longitudinal direction by the support rod 200 and is coupled with the housing 320 to cover the compartment 324. The cap 310 supports the outer tub 42 and is movable along the support rod 200. That is, the edge portion of the cap 310 may be caught by the holder 44 to support the outer tub 42, and the central portion of the cap 310 may protrude above the holder 44.

The cap 310 supports the outer tub 42 while being coupled to the upper side of the housing 320. The cap 310 and the housing 320 may be detachably coupled. Accordingly, it is possible to easily inject lubricant into the interior of the suspension array 100.

It is necessary to inject or replenish the lubricant for maintenance during use, as well as in the manufacturing process of the clothes treating apparatus 1000. In order to inject or replenish the lubricant, the cap 310 is separated from the housing 320 and pushed upward to expose the support rod 200 that is covered by the cap 310, and the lubricant may be directly applied to the exposed support rod 200.

Furthermore, the lubricant may be injected into the friction member 330 disposed inside the housing 320. The injection of lubricant in this way may be very convenient since it can be done without the rest of the configuration of the suspension array 100 being separated from the support rod 200.

Meanwhile, even if the housing 320 and the cap 310 are not firmly coupled to each other, since the cap 310 located on the upper side of the housing 320 supports the outer tub 42, the cap 310 and the housing 320 may move integrally together along the support rod 200 due to the load of the outer tub 42.

Figure 6:
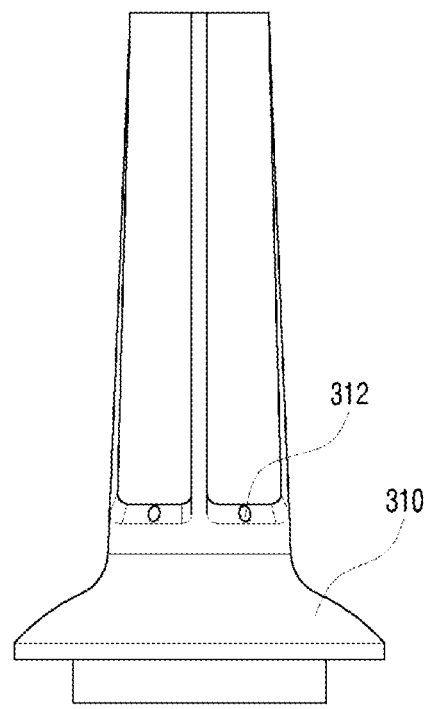
FIG. 6 is a perspective view showing in more detail a housing and a cap in the clothes treating apparatus according to one embodiment of the present disclosure.
Figure 6:
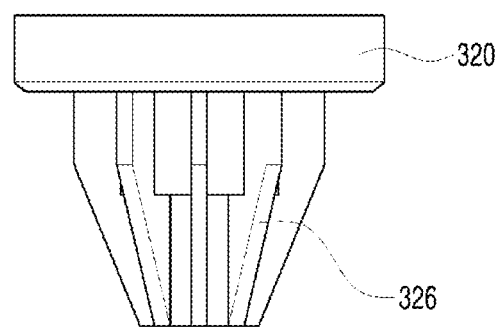
Figure 7:
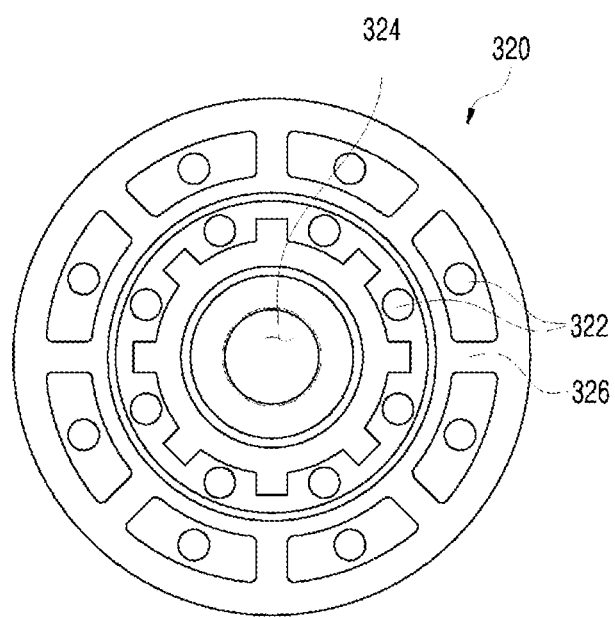
FIG. 7 is a plan view of the housing of FIG. 6.

FIG. 6 is a perspective view showing in more detail the housing and the cap in the clothes treating apparatus according to one embodiment of the present disclosure. FIG. 7 is a plan view of the housing of FIG. 6.

As shown in FIGS. 6 and 7, in the suspension array 100 and the clothes treating apparatus 1000 including the suspension array 100 according to one embodiment of the present disclosure, the housing 320 includes one or more first holes 322 configured to discharge, to the outside, condensate generated in an inner space defined by the coupling between the cap 310 and the housing 320.

As described above, in the vibration damping process in which the elastic member 230 and the friction member 330 are used, the condensate may be generated in the inner space defined by the coupling between the cap 310 and the housing 320.

For example, when the friction member 330 in the compartment 324 of the housing 320 is moved up and down along the support rod 200, air compression may occur in some spaces within the compartment 324.

In this case, since the clothes treating apparatus 1000 is generally exposed to a high humidity environment, the condensate may be generated by the compression of air containing large amounts of moisture. Alternatively, even if air compression does not occur, the condensate may be generated due to temperature change in the place where the clothes treating apparatus 1000 is disposed.

The performance of the friction member 330 may be deteriorated when the generated condensate comes into contact with the friction member 330 made of felt or the like. Particularly, since materials such as felt may be hydrolyzed when exposed to a high temperature and high humidity environment and thus may not exhibit its original performance, it may be very undesirable for the friction member 330 to contact the condensate.

Accordingly, the suspension array 100 and the clothes treating apparatus 1000 including the suspension array 100 according to the present embodiment are configured to discharge the condensate generated in the inner space to the outside through the one or more first holes 322.

As described above, the suspension array 100 and the clothes treating apparatus 1000 including the suspension array 100 according to the present embodiment, the condensate generated in the inner space, defined by the coupling between the housing 320 and the cap 310, is discharged to the outside through the one or more first holes 322 formed in the housing 320, thereby preventing the performance of the suspension array 100 from deteriorating even if the condensate is generated in the vibration damping process.

In the suspension array 100 and the clothes treating apparatus 1000 including the suspension array according to the present embodiment, the one or more first holes 322 may be formed along the circumference of the housing 320 on the faying surface of the housing 320 coupled to the cap 310.

That is, as shown in FIG. 7, the upper surface of the housing 320 may correspond to a faying surface that is coupled with the lower surface of the cap 310. In addition, a plurality of first holes 322 may be formed on the faying surface of the housing 320 coupled to the cap 310 around the central portion where the compartment 324 is formed.

As described above, since the friction member 330 is disposed in the compartment 324 of the housing 320, it is necessary to minimize the inflow of the generated condensate into the compartment 324.

Therefore, by forming the plurality of first holes 322 around the center portion of the housing 320 in which the compartment 324 is formed, the generated condensate may be discharged to the outside before reaching the compartment 324.

In particular, since the faying surface of the housing 320 coupled to the cap 310 is a horizontal plane, the condensate may be naturally discharged by gravity through the one or more first holes 322 passing through the faying surface of the housing 320 coupled to the cap 310.

As described above, in the suspension array 100 and the clothes treating apparatus 1000 including the suspension array 100 according to the present embodiment, since the one or more first holes 322 are formed along the circumference of the housing 320 on the faying surface of the housing 320 coupled to the cap 310, the internal condensate generated in the vibration damping process may be discharged to the outside without contacting the friction member 330.

In the suspension array 100 and the clothes treating apparatus 1000 including the suspension array 100 according to the present embodiment, the housing 320 includes a plurality of ribs 326 that protrude radially around the compartment 324 and along the faying surface of the housing 320 coupled to the cap 310. The one or more first holes 322 may be formed between ribs 326 on the faying surface of the housing 320 coupled to the cap 310.

As described above, a space in communication with the outside needs to be formed at the bottom of the faying surface of the housing 320 coupled to the cap 310 so that the condensate may be discharged to the outside in the longitudinal direction through the one or more first holes 322 on the faying surface.

Therefore, excluding the central portion of the housing 320 in which the compartment 324 is formed, it is necessary that members are not formed in the outer portion of the housing 320 corresponding to the lower portion of the faying surface of the housing 320 coupled to the cap 310.

However, since the housing 320 is a member supported by the elastic member 230 and is moved up and down due to vibration generated in the clothes treating apparatus 1000, it is necessary that the housing 320 has a predetermined structural rigidity.

Accordingly, by forming the outer portion, corresponding to the lower portion of the faying surface of the housing 320 coupled to the cap 310, with a member having a rib 326 structure rather than an integral member, the space in communication with the one or more first holes 322 and the structural rigidity of the housing 320 may be simultaneously secured.

When a plurality of ribs 326 are formed in the housing 320 to project radially around the compartment 324 along the faying surface of the housing 320 coupled to the cap 310 as shown in FIG. 6, the ribs 326 may not interfere with the elastic member 230 supporting the housing 320 and, at the same time, the housing 320 may maintain a predetermined structural rigidity.

As shown in FIG. 7, when the one or more first holes 322 are formed between the ribs 326 on the faying surface of the housing 320 coupled to the cap 310, since the ribs 326 do not interfere with the one or more first holes 322 formed through the faying surface, the one or more first holes 322 may communicate with the outside through the faying surface without any problems.

As described above, in the suspension array 100 and the clothes treating apparatus 1000 including the suspension array 100 according to the present embodiment, since a plurality of ribs 326 are formed to protrude radially around the compartment 324 of the housing 320 and the one or more first holes 322 are formed between the ribs 326, it is possible to easily form the one or more first holes 322 on the circumference of the housing 320 as well as to properly maintain the structural rigidity of the housing 320.

Figure 8:
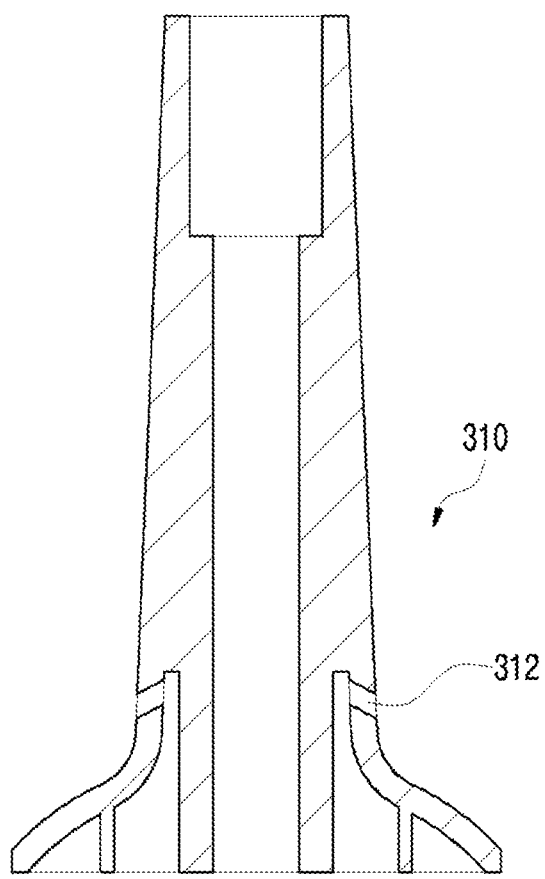
FIG. 8 is a side cross-sectional view of the cap of FIG. 6.
Figure 9:
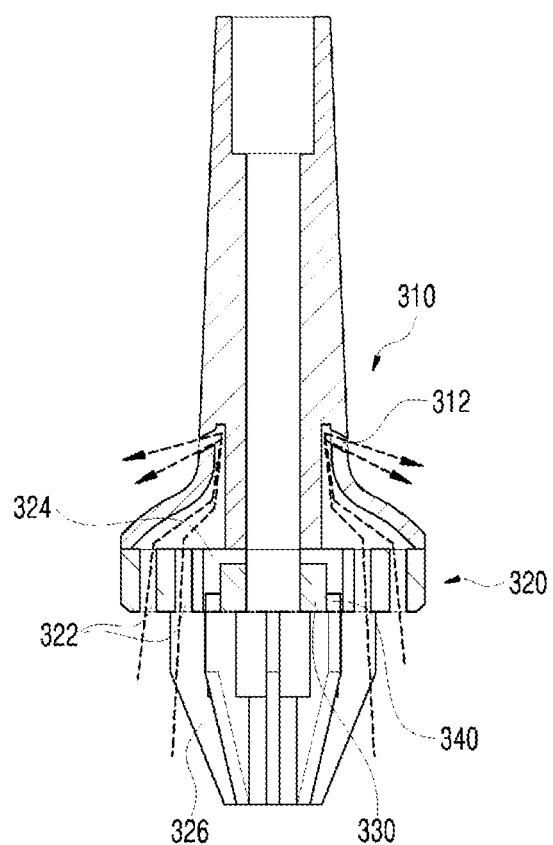
FIG. 9 is a view showing air ventilation in a state in which the housing and the cap are coupled in the clothes treating apparatus according to one embodiment of the present disclosure.

FIG. 8 is a side cross-sectional view of the cap of FIG. 6. FIG. 9 is a view showing the air ventilation in a state in which the housing and the cap are coupled in the clothes treating apparatus according to one embodiment of the present disclosure.

As shown in FIGS. 8 and 9, in the suspension array 100 and the clothes treating apparatus 1000 including the suspension array 100 according to the present embodiment, the cap 310 may include one or more second holes 312 configured to communicate with the one or more first holes 322 to ventilate, to the outside, the air in the inner space defined by the coupling between the cap 310 and the housing 320.

As described above, the friction between the friction member 330 and the support rod 200 may produce frictional heat in a vibration damping process. Excessive frictional heat may cause damage to or deformation of the friction member 330. In particular, when moisture and high frictional heat are applied to the friction member 330, the friction member 330 may be hydrolyzed and fail to exhibit its original function.

Therefore, in order to prevent the friction member 330 from being damaged or deformed, it is necessary to smoothly discharge, to the outside, friction heat generated in the inner space defined by the coupling between the cap 310 and the housing 320.

To this end, in the suspension array 100 and the clothes treating apparatus 1000 including the suspension array 100 according to the present embodiment, the one or more first holes 322 and the one or more second holes 312 communicate with each other so that the inside air may be ventilated to the outside, thereby causing frictional heat within the inner space to be discharged to the outside.

As described above, in the suspension array 100 and the clothes treating apparatus 1000 including the suspension array 100 according to the present embodiment, the one or more second holes 312 formed in the cap 310 communicates with the one or more first holes 322 so that the air in the inner space, defined by the coupling between the housing 320 and the cap 310, is ventilated to the outside, thereby preventing the performance of the suspension array 100 from deteriorating even if the frictional heat is generated within the inner space in the vibration damping process.

In the suspension array 100 and the clothes treating apparatus 1000 including the suspension array 100 according to the present embodiment, the one or more second holes 312 may be formed along the circumference of the cap 310 on the side of the cap 310.

The cap 310 may be configured to have a predetermined length to stably move up and down along the support rod 200.

Accordingly, the cap 310 has a relatively long side, and thus a larger number of second holes 312 may be formed on the side of the cap 310.

When the one or more second holes 312 are formed on the faying surface of the cap 310 coupled to the housing 320, external water is easily introduced into the interior through the one or more second holes 312, and the separation distance between the one or more first holes 322 and the one or more second holes 312 becomes relatively short, thereby reducing the air ventilation efficiency.

Therefore, forming a plurality of second holes 312 along the circumference of the cap 310 on the side surface of the cap 310 may be expected to produce the most efficient air ventilation effect.

As such, in the suspension array 100 and the clothes treating apparatus 1000 including the suspension array 100 according to the present embodiment, since the one or more second holes 312 are formed along the circumference of the cap 310 on the side surface of the cap 310, more second holes 312 may be formed, and thus the inside air may be ventilated smoothly to the outside.

In the suspension array 100 and the clothes treating apparatus 1000 including the suspension array 100 according to the present embodiment, the one or more second holes 312 may be formed to be inclined downward from the inside of the cap 310 toward the outside.

That is, as illustrated in FIG. 8, the one or more second holes 312 may be formed such that one end of the hole 312 exposed on the outer surface of the cap 310 is located at a lower height than the other end of the second hole 312 formed on the inner surface of the cap 310. Accordingly, when water flows along the outer surface of the cap 310, the inflow of water through the one or more second holes 312 may be minimized.

In addition, even if the one or more second holes 312 are formed as described above, since there is no problem in the air ventilation through the communication between the one or more first holes 322 and the one or more second holes 312, it may be most desirable to form the one or more holes 312 to be inclined.

In the suspension array 100 and the clothes treating apparatus 1000 including the suspension array 100 according to the present embodiment, since the one or more second holes 312 may be formed to be inclined downward from the inside of the cap 310 toward the outside, the inflow of water from outside the cap 310 through the one or more second holes 312 may be minimized.

In the suspension array 100 and the clothes treating apparatus 1000 including the suspension array 100 according to the present embodiment, the one or more first holes 322 may be formed in a plurality of rows along the circumference of the housing 320.

That is, as illustrated in FIG. 7, the one or more first holes 322 may be formed along the circumference of the housing 320 at positions gradually increasing in distance from the center of the housing 320.

The condensate may be generated anywhere in the inner space defined by the coupling between the cap 310 and the housing 320, and the generated condensate may move to any location through a gap or the like.

Therefore, it is necessary to form the one or more first holes 322 at as many different points as possible, so that the condensate may be discharged smoothly even if the condensate is generated and moves in various ways.

As described above, in the suspension array 100 and the clothes treating apparatus 1000 including the suspension array 100 according to the present embodiment, since the one or more first holes 322 are formed in a plurality of rows along the circumference of the housing 320, the condensate may be discharged smoothly even if the condensate is generated at various points.

In the suspension array 100 and the clothes treating apparatus 1000 including the suspension array 100 according to the present embodiment, the one or more first holes 322 may be formed symmetrically around the support rod 200, and the one or more second holes 312 may be formed symmetrically around the support rod 200.

The suspension array 100 may be installed obliquely depending on the installation form and structure of the main body 10 and the washing tub 40. In addition, the installation angle of the suspension array 100 may be variously changed depending on vibrations of the clothes treating apparatus 1000 or the like.

Accordingly, a specific portion of the friction member 330 is more closely adhered to the support rod 200, such that more frictional heat may be generated in the specific portion. However, it is virtually impossible to predict this specific portion in advance, and this specific portion may change from time to time.

Therefore, even if a lot of frictional heat is generated in the specific portion, it may be most desirable to dissipate the heat by rapidly spreading the heat to adjacent portions so that the heat is evenly distributed over all possible portions.

In the suspension array 100 and the clothes treating apparatus 1000 including the suspension array 100 according to the present embodiment, since the one or more first holes 322 are formed symmetrically around the support rod 200 and the one or more second holes 312 are formed symmetrically around the support rod 200, the frictional heat may not be concentrated in the specific portion and may be uniformly discharged as a whole.

In the suspension array 100 and the clothes treating apparatus 1000 including the suspension array 100 according to the present embodiment, the one or more second holes 312 may be formed with a diameter of a size that allows passage of gas-phase particles but not liquid-phase particles.

Accordingly, the air in the inner space, defined by the coupling between the cap 310 and the housing 320, may be ventilated to the outside, but water from the outside may be blocked from flowing into the interior through the one or more second holes 312.

Alternatively, separate filters or the like may be installed in the one or more second holes 312 to allow passage of gas-phase particles but not liquid-phase particles.

As described above, in the suspension array 100 and the clothes treating apparatus 1000 including the suspension array 100 according to the present embodiment, since the one or more second holes 312 may be formed with a diameter of a size that allows passage of gas-phase particles but not liquid-phase particles, the air may be smoothly ventilated to the outside through the one or more second holes 312, and the inflow of water from the outside through the one or more second holes 312 may be prevented.

Here, the one or more first holes 322 may be formed with a diameter of a size that allows passage of liquid-phase particles.

As described above, the one or more second holes 312 need to be configured such that liquid-phase particles cannot pass therethrough, and the one or more first holes 322 need to be configured such that liquid-phase particles can pass therethrough and thus the condensate can be drained.

When liquid-phase particles can pass through the one or more first holes 322, gas-phase particles smaller than the liquid-phase particles can also pass through the one or more first holes 322. Therefore, there may be no problem with air ventilation.

As described above, in the suspension array 100 and the clothes treating apparatus 1000 including the suspension array 100 according to the present embodiment, since the one or more first holes 322 are formed with a diameter of a size that allows passage of liquid-phase particles, the air ventilation to the outside as well as the discharge of the condensate through the one or more first holes 322 may be smoothly performed.

While the foregoing has been given by way of illustrative example of the present disclosure, all such and other modifications and variations thereto as would be apparent to those skilled in the art are deemed to fall within the broad scope and ambit of this disclosure as is herein set forth. Accordingly, such modifications or variations are not to be regarded as a departure from the spirit or scope of the present disclosure, and it is intended that the present disclosure cover the modifications and variations of this disclosure provided they come within the scope of the appended claims and their equivalents.

What is claimed is:

1. A suspension array, comprising:
   a housing that defines a compartment;
   a support rod that is coupled to the housing and extends through the compartment along a longitudinal direction;
   an elastic member that supports the housing and is wound around the support rod;
   a friction member disposed inside the compartment and configured to, based on moving in the compartment relative to the support rod, apply friction force to the support rod; and
   a cap that is coupled to the housing and covers the compartment, the support rod passing through the cap,
   wherein the housing has a faying surface that is coupled to the cap, and
   wherein the housing defines one or more first holes that pass through the faying surface of the housing and fluidly communicate with an outside of the suspension array, the one or more first holes being configured to discharge, to the outside of the suspension array, condensate in an inner space defined between the cap and the housing.

2. The suspension array according to claim 1, wherein the one or more first holes are arranged along a circumference of the housing at the faying surface of the housing coupled to the cap.

3. The suspension array according to claim 2, wherein an outer diameter of the housing increases in a direction toward the faying surface, and an outer diameter of the cap decreases in a direction away from the faying surface.

4. The suspension array according to claim 2, wherein the housing comprises a plurality of ribs that protrude radially outward relative to the compartment and are arranged around the compartment along the circumference of the housing, and
   wherein the one or more first holes are defined between two of the plurality of ribs.

5. The suspension array according to claim 4, wherein each of the plurality of ribs has an outer surface that is inclined with respect to the longitudinal direction of the support rod.

6. The suspension array according to claim 1, wherein the cap defines one or more second holes configured to communicate with the one or more first holes and to ventilate air in the inner space to the outside.

7. The suspension array according to claim 6, wherein the one or more second holes are defined at a side surface of the cap and arranged along a circumference of the cap.

8. The suspension array according to claim 7, wherein the one or more second holes extends from an inside of the cap toward the outside in a direction inclined downward with respect to the longitudinal direction.

9. The suspension array according to claim 6, wherein the one or more first holes are arranged symmetrically with respect to a center axis of the support rod, the center axis extending in the longitudinal direction, and
   wherein the one or more second holes are arranged symmetrically with respect to the center axis of the support rod.

10. The suspension array according to claim 6, wherein the one or more second holes are configured to, based on a diameter of the one or more second holes, block liquid-phase particles while allowing passage of gas-phase particles.

11. The suspension array according to claim 10, wherein the one or more first holes are configured to, based on a diameter of the one or more first holes, allow passage of liquid-phase particles.

12. The suspension array according to claim 1, wherein the one or more first holes are arranged in a plurality of rows along a circumference of the housing.

13. The suspension array according to claim 1, wherein the elastic member comprises a coil spring that surrounds the support rod and the housing.

14. The suspension array according to claim 1, wherein the friction member has a cylindrical shape and defines a through hole receiving the support rod.

15. A clothes treating apparatus, comprising:
a main body that defines a receiving space therein;
a washing tub disposed in the receiving space and coupled to the main body; and
at least one suspension array that couples the washing tub to the main body, the suspension array comprising:
  a housing that defines a compartment,
  a support rod that is coupled to the housing and extends through the compartment in a longitudinal direction, the support rod having a first end connected to the main body,
  an elastic member that supports the housing and is wound around the support rod,
  a support member that supports the elastic member and is connected to a second end of the support rod,
  a friction member disposed inside the compartment and configured to, based on moving in the compartment relative to the support rod, apply friction force to the support rod, and
  a cap that is coupled to the housing, that covers the compartment, and that is configured to support the washing tub, the support rod passing through the cap,
wherein the housing has a faying surface that is coupled to the cap, and
wherein the housing defines one or more first holes that pass through the faying surface of the housing and fluidly communicate with an outside of the suspension array, the one or more first holes being configured to discharge, to the outside of the suspension array, condensate in an inner space defined between the cap and the housing.

16. The clothes treating apparatus according to claim 15, wherein the one or more first holes are arranged along a circumference of the housing at the faying surface of the housing coupled to the cap.

17. The clothes treating apparatus according to claim 16, wherein the housing comprises a plurality of ribs that protrude radially outward relative to the compartment and are arranged around the compartment along the circumference of the housing, and
wherein the one or more first holes are defined between two of the plurality of ribs.

18. The clothes treating apparatus according to claim 15, wherein the cap defines one or more second holes configured to communicate with the one or more first holes and to ventilate air in the inner space to the outside.

19. The clothes treating apparatus according to claim 18, wherein the one or more second holes are defined at a side surface of the cap and arranged along a circumference of the cap.

20. The clothes treating apparatus according to claim 19, wherein the one or more second holes extends from an inside of the cap toward the outside in a direction inclined downward with respect to the longitudinal direction.

* * * * *